United States Patent
Bowen (10) Patent No.: US 11,820,521 B2
(45) Date of Patent: Nov. 21, 2023

(54) PARACHUTE COMPOUND PULLEY RIPCORD PULL FORCE REDUCER AND METHODS FOR UTILIZING SAME

(71) Applicant: UNINSURED UNITED PARACHUTE TECHNOLOGIES, LLC., Deland, FL (US)

(72) Inventor: Ty Philip Bowen, Mims, FL (US)

(73) Assignee: uninsured United Parachute Technologies, LLC, Deland, FL (US)

( * ) Notice: Subject to any disclaimer, the term of this patent is extended or adjusted under 35 U.S.C. 154(b) by 275 days.

(21) Appl. No.: 17/115,798

(22) Filed: Dec. 9, 2020

(65) Prior Publication Data

US 2021/0179279 A1    Jun. 17, 2021

Related U.S. Application Data (60) Provisional application No. 62/947,730, filed on Dec. 13, 2019.

(51) Int. Cl.
*B64D 17/52* (2006.01)
*B64D 17/46* (2006.01)

(52) U.S. Cl.
CPC ............. *B64D 17/52* (2013.01); *B64D 17/46* (2013.01)

(58) Field of Classification Search
CPC ................................ B64D 17/52; B64D 17/46
See application file for complete search history.

(56) References Cited

U.S. PATENT DOCUMENTS 3,193,223 A * 7/1965 Davis ..................... B64D 17/34
74/2
2012/0291234 A1    11/2012 Berge

FOREIGN PATENT DOCUMENTS

| FR | 676112 A | 2/1930 |
| GB | 1449253 A | 9/1976 |
| WO | WO-0128876 A1 * | 4/2001 ............. B64D 17/52 |
| ZA | 200203036 B | 2/2003 |

* cited by examiner

*Primary Examiner* — Justin M Benedik
(74) *Attorney, Agent, or Firm* — Frank B. Arenas, Esq.; Shalom Wertsberger (57) ABSTRACT

An apparatus and an article of manufacture providing a parachute ripcord pull force reducer device, method and system offering mechanical gain such that the pull force required to pull the main parachute closing pin is reduced. Further disclosed is a parachute container using the novel parachute ripcord pull force reducer, and methods for manufacturing and/or modifying a parachute to operate with various embodiments of the ripcord pull force reducer in accordance with the instant disclosure.

5 Claims, 10 Drawing Sheets

PARACHUTE COMPOUND PULLEY RIPCORD PULL FORCE REDUCER AND METHODS FOR UTILIZING SAME

COPYRIGHT NOTICE

A portion of the disclosure of this Patent document, including the drawings and Appendices, contain material which is subject to copyright protection. The copyright owner has no objection to the facsimile reproduction by anyone of the Patent document or the Patent disclosure as it appears in the Patent and Trademark Office Patent files or records as long as clear and visible reference is made showing the applicant, patent or patent publication number, but otherwise reserves all copyright rights whatsoever.

RELATED APPLICATIONS

This application claims priority from, and benefit of, U.S. Provisional Patent Application No. 62/947,730, filed Dec. 14, 2019, and which is incorporated here by reference in its entirety to the extent it does not conflict with this instant disclosure herein.

FIELD OF THE INVENTION

Versions and embodiments of the present invention relate generally to parachute equipment. Particularly, embodiments of the invention relate to parachutes and deployment thereof. More particularly, versions of the invention relate to parachute ripcord devices used for deployment of a parachute. Specifically, versions of the invention relate to parachute compound pulley ripcords for parachute systems utilizing a drogue, and new, useful and unobvious versions thereof.

BACKGROUND

The art discussed herein is not to be considered admitted prior art but is presented to more clearly discuss and describe what is still lacking in the earlier art.

Personal parachutes were commonly deployed in freefall by pulling a line known as a ripcord, releasing a spring loaded pilot chute. The pilot chute acts as an "anchor in the sky" to deploy the parachute. Spring loaded pilot chutes evolved to "hand deploy" spring-less pilot chutes. In tandem parachute systems a drogue parachute is commonly used which is deployed first to reduce terminal speed of the freefall portion of the descent. Such tandem parachuting involve a human operator, a cargo load and/or passenger carried by the operator in a releasable harness, tandem parachute container system, containing a main parachute in a deployment bag, reserve/emergency parachute, drogue parachute and in embodiments of the invention a ripcord pull force reducer, the parachute(s) coupled to the human operator.

Figure 1:
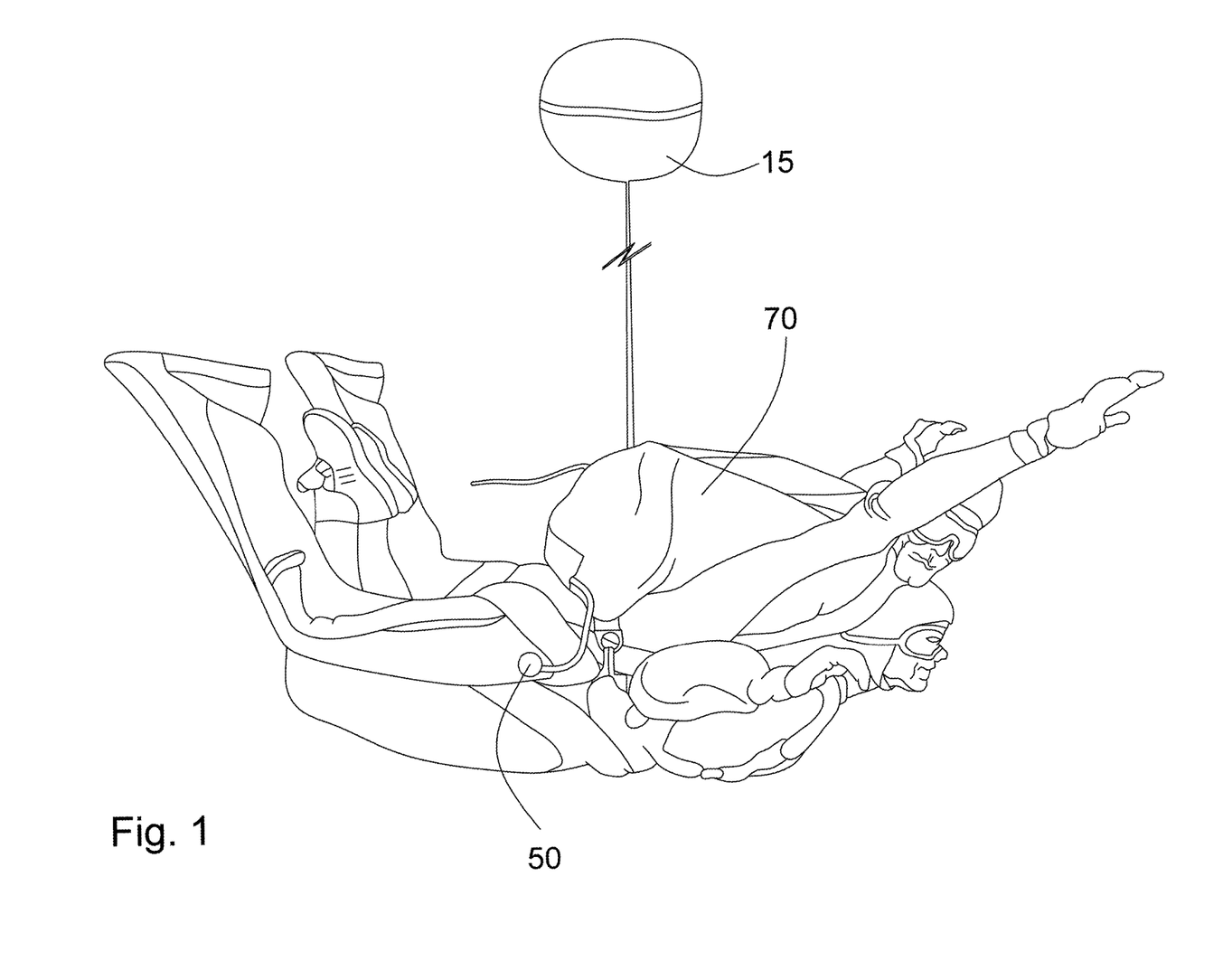
FIG. 1 depicts a tandem system in drogue fall.

When such a tandem parachute system equipped operator exits an aircraft at an exit altitude, the drogue parachute is deployed almost immediately, commonly by throwing the drogue into the slipstream. The portion of the descent under the deployed drogue is known as drogue fall. FIG. 1 depicts a schematic right side view of a tandem parachute system in drogue fall. The drogue 15 is deployed as, or shortly after, the operator exits the airplane, and the system terminal speed is reduced due to aerodynamic drag exerted by the drogue.

The drogue slows down the terminal velocity fall rate of the system load. When the ripcord is pulled by the operator, flaps are released to open the main parachute container 70, releasing the drogue and deploying the main parachute.

Figure 2:
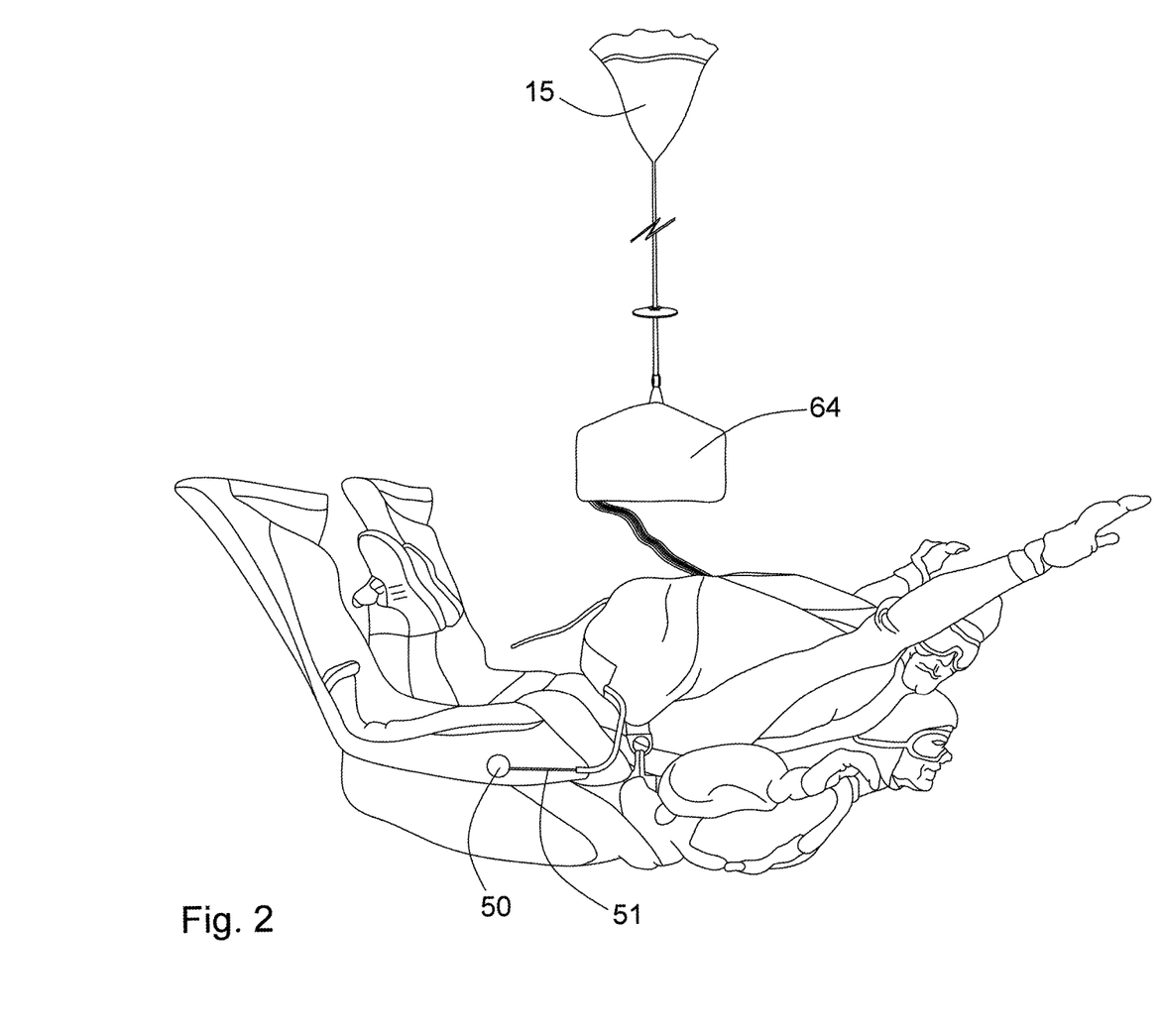
FIG. 2 depicts a tandem system after activation of the ripcord device.

FIG. 2 depicts a schematic right side view of the tandem system after a ripcord is pulled, deploying the main parachute. The operator begins the main parachute deployment by pulling on the ripcord handle 50. Pulling the ripcord pulls a pin 45, which releases a closing loop 55, allowing at least one flap in the parachute container to open. Opening the parachute container flap(s) allows the main parachute bag 64 to be extracted, releases the drogue and begins a sequence that would lead to full deployment of the main parachute, as known.

The aerodynamic drag of the drogue causes high tensile load between the drogue and the tandem load, resulting in high pull forces required from the human operator when pulling the ripcord.

Ripcords for parachute container opening/deployment systems are conventionally "direct pull" or single pulley devices that utilize little or no leverage advantage to reduce pull forces by the operator. Those pull forces are even higher in tandem parachute personnel systems which adds the weight of a passenger and/or cargo harnessed to the tandem system operator. After exiting an aircraft in flight, the added mass of the passenger and/or cargo increases freefall terminal velocity of the operator. As described above a common solution to this problem utilizes a drogue parachute in freefall to add drag to the system. The drogue parachute drag slows terminal velocity of the freefall significantly to reduce parachute opening forces (opening shocks) that can damage and/or injure the passenger and/or the tandem parachute operator and/or cargo. Further, a high opening shock can cause a main parachute malfunction and/or other emergencies.

Higher terminal velocity associated with tandem parachute systems implies higher "opening shock" forces. As human operated tandem suspended loads increase (sometimes exceeding 1,000 pounds), the ripcord pull force required from a human operator increases non-linearly and can exceed the human strength required to deploy the main parachute. This increase in ripcord pull force may prevent a successful ripcord pull at safe opening altitudes and may require the operator to deploy the reserve parachute, reducing safety margins.

Figure 3:
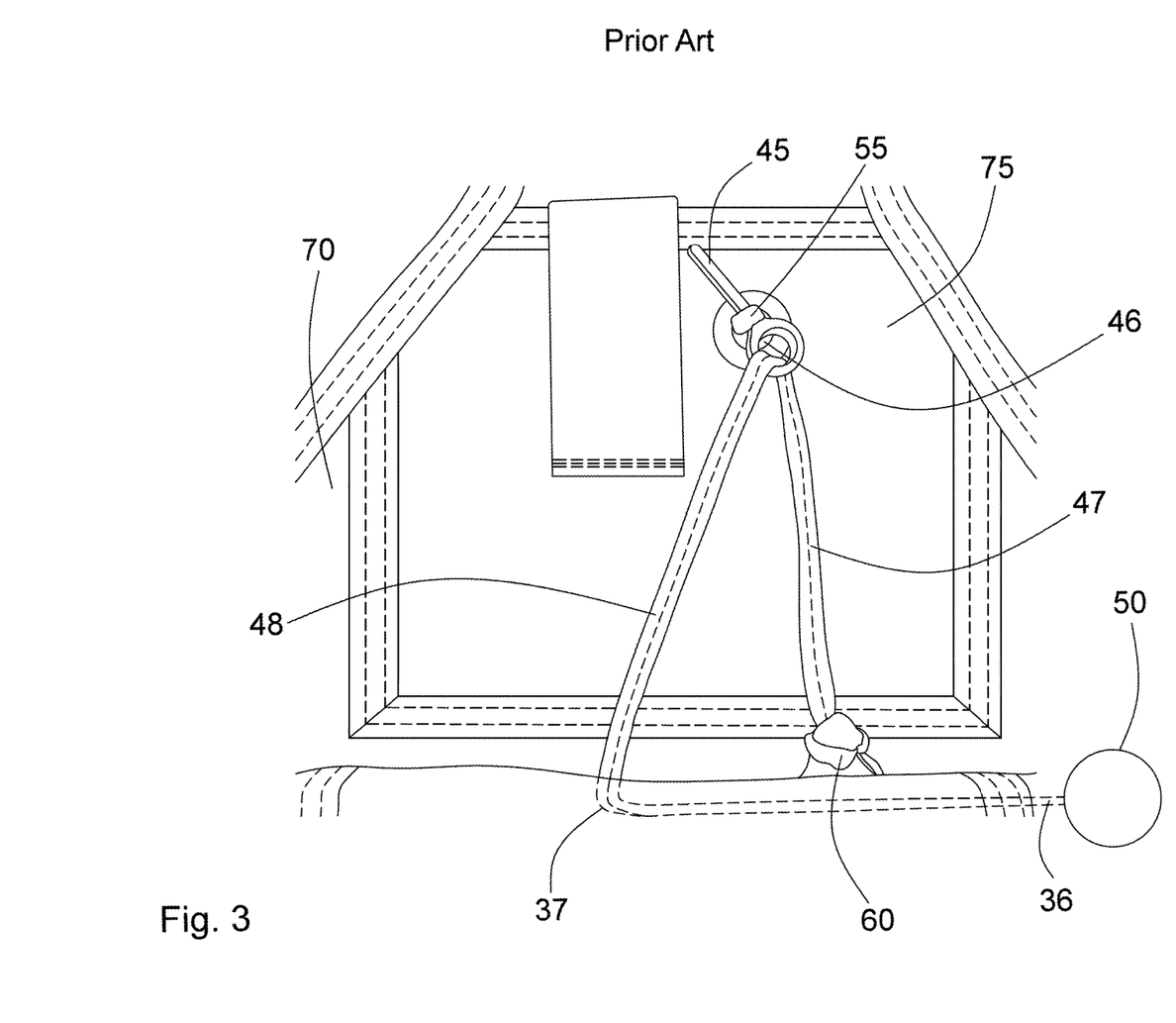
FIG. 3 depicts a front view of the prior art utilized to release flaps by pulling on a ripcord.

FIG. 3 is a simplified depiction of the prior art ripcord mechanism. The parachute container is closed by the interaction of one or more flaps 75 which cooperate with a closing loop 55 commonly passed via a hole in at least one flap. A pin 45 is passed via the closing loop and prevents the flap(s) from opening, thus preventing the parachute from being pulled out of the parachute container 70. One end of an activation line 36 is attached to an anchor point 60. From the anchor point, a portion 47 of the activation line extends towards a pin eyelet 46 and passing therethrough. The portion of the activation line extending downstream (further from the anchor point) from the pin eyelet 46 forms the tension section 48 which extends away from the pin in a manner and direction that would exert pulling force on the pin when a tensile force is applied to tension section 48 by pulling the pull handle 50, such that the pulling force dislodges the pin 45 from the closing loop 55. The tension section 48 is coupled to the pull handle 50. In several embodiments a section of the activation line downstream from the tension section 48 passes through a channel 37 for protection of the activation line and for convenient placement of the pull handle, and the tension section is coupled to the handle 50 via an extension section of the activation line.

No ripcord device and/or system is known to this inventor that addresses the deficiencies in the earlier art as is used in conventional parachute drogue release ripcords. This new, useful and unobvious invention, in various embodiments, accomplishes this much needed advantage of increase in safety and reduction in pull forces as compared to conventional parachute ripcord devices and/or systems, and is especially advantageous in tandem parachuting system or in other circumstances involving high dynamic loads.

Prior art solutions have been a direct-pull ripcord or single pulley ripcord with no significant mechanical advantage. Therefore, there is an ongoing and heretofore unmet need for a reliable ripcord device and system that can reduce required ripcord pull forces so as to increasing safety and personal comfort of the parachute operator.

An aspect of the present invention further comprises a method of rigging parachutes utilizing any and all aspects of the rip cord pull force reduction mechanisms.

SUMMARY

Thus, in aspects of the invention disclosed herein are parachute compound pulley ripcord pull force reducer and system (referred to in these specification as "ripcord pull force reducer", or equivalently a "force reducer" for brevity) for parachute systems in general, and which especially benefit tandem parachuting systems. It is estimated that certain versions of the invention are able to reduce pull forces by about 40 percent or more of the conventional forces, depending on suspended weight in drogue fall. The skilled person would recognize the utility of the presently disclosed force reducer to enhance safety for human deployed parachute systems, and especially for human deployed tandem parachute systems.

Advantages of versions of the present invention include avoidance of most if not all of the above prior art shortcomings by using the disclosed ripcord pull force reducer and other novel arrangements.

It is an object of certain aspects of the present invention to provide a ripcord pull force reducer to reduce pull forces required to deploy a main parachute with a heavy passenger and/or cargo load. It is a further object of the invention to provide ripcord pull force reduction in tandem parachute systems.

Thus an aspect of the invention provides a ripcord pull force reducer using a compound pulley system mechanical advantage to provide a smoother and easier ripcord pull action by the human operator, improving safety.

Aspects of the present invention are usable with any parachute systems, however they are especially advantageous for tandem parachuting systems and thus, such tandem systems would be utilized herein by way of example to explain and exemplify various elements of the invention, in non-limiting manner, as the person skilled in the art would readily recognize the advantages of the invention to other parachute systems.

Ripcord pull force reducing mechanisms as described in any of the aspects and embodiments disclosed herein may be utilized in a sport and/or military tandem parachute personnel system.

Thus in an aspect of the invention there is provided a parachute compound pulley ripcord pull force reducer comprising a flexible activation line having a first end fixedly coupled to a movable pulley member, the activation line extending therefrom and slidingly engaging a pin at a pin engagement point, a portion of the activation line forming a first tension section extending generally between the pulley member and an anchor point, the activation line further extending from the anchor point to the pulley member and slidingly engaging the pulley member, a portion of the activation line forming a second tension section between the anchor point and the pulley member, and further extending away from the pulley member to form a third tension section coupled to a pull handle. The first, second and third tension sections are arranged such that when tensile force is applied to the activation line from the pull handle, the second and third tension sections form a dynamically determined pulley angle $\alpha$ therebetween, the pulley angle apex is at the movable pulley member, and the angle $\alpha$ is smaller than 180°. The movable pulley member is arranged such that a tensile force is transmitted thereto by the second and third tension section causes movement thereof in a direction that form a dynamically determined pin angle $\beta$ between a first and a second force sections of the first tension section dynamically determined at the pin engagement point, the pin angle apex being at the engagement point, and the angle $\beta$ is smaller than 180°. The force sections, as well as portions of the tension sections of the activation line change dynamically during a pull of the pull handle, as the sections are determined by the components between which they extend, and as at least the movable pulley member and the pin are being moved during such pull operation.

Optionally the pin comprises an eyelet and the eyelet is the engagement point.

In certain embodiments the first tension section is formed by a first flexible activation line segment and the second and third tension sections are formed by a second flexible activation line segment.

In another optional embodiment, the parachute ripcord pull force reducer anchor point comprises a second pulley member, and the activation line slidingly engages the second pulley member.

Thus in an embodiment of the invention utilizing a second, stationary pulley member the parachute compound pulley ripcord pull force reducer comprises a flexible activation line having a first end fixedly coupled to a movable pulley member, the activation line extends therefrom and slidingly engages a pin at an engagement point, a portion of the activation line forming a first tension section extending generally between the movable pulley member and a fixed pulley member which forms an anchor point. The activation line slidingly engages the fixed pulley member and further extends from the fixed pulley member to the movable pulley member and slidingly engaging the movable pulley member, a portion of the activation line forming a second tension section between the fixed pulley member and the movable pulley member, the activation line further extends away from the movable pulley member to form a third tension section coupled to a pull handle. The first, second and third tension sections are arranged such that when tensile force is applied to the activation line from the pull handle, the second and third tension sections form a dynamically determined pulley angle therebetween, the pulley angle apex being at the movable pulley member; and the movable pulley member are arranged such that a tensile force is transmitted thereto by the second and third tension section would move the movable pulley in direction that form a pin angle between a dynamically determined first and a second force sections of the first tension section, the pin angle apex being at the engagement point. The pulley angle and the pin angle are each smaller than 180°, so as to allow exerting the combined forces to operate on the pulley and the pin respectively in the described manner, so as to dislodge the pin.

In yet another optional embodiment there is provided a parachute compound pulley ripcord pull force reducer comprising a pin activation line having a first end fixedly coupled to a movable pulley member, the pin activation line extends from the pulley member, and slidingly engages a pin at an engagement point, a portion of the pin activation line forming a first tension section extending generally between the pulley member and a first anchor point. A pulley activation line extends from a second anchor point to the pulley member and slidingly engaging therewith, a portion of the pulley activation line forming a second tension section between the second anchor point and the pulley member, the pulley activation line extends away from the pulley member to form a third tension section coupled to a pull handle. The first, second and third tension sections are arranged such that when tensile force is applied to the pulley activation line from the pull handle, the second and third tension sections form a pulley angle therebetween, the pulley angle apex being at the pulley member and the pulley angle being smaller than 180°; and the pulley member is arranged such that a tensile force is transmitted thereto by the second and third tension section would move it in a direction that form a pin angle between a first and a second force sections of the first tension section dynamically determined at the engagement point, the pin angle apex being at the engagement point, the pin angle being smaller than 180°.

In a second aspect of the invention there is provided a parachute container comprising a compartment comprising a backing 71 and at least one flap having a closing hole, a closing loop coupled to the deployment bag or the parachute container, the closing loop positioned to interact with the closing hole to maintain the flap in a closed state by a pin passed in the closing loop, an anchor point coupled to the container, a pin having a pin engagement point, and an activation line having a pulley member coupled to an end thereof, the activation line extends from the pulley member and slidingly engages the pin at an engagement point, a portion of the activation line forming a first tension section extending generally between the pulley member and an anchor point, the activation line further extends from the anchor point to the pulley member and slidingly engaging the pulley member, a portion of the activation line forming a second tension section between the anchor point and the pulley member, and further extends away from the pulley member to form a third tension section coupled to a pull handle. The first, second and third tension sections are arranged such that when tensile force is applied to the activation line from the pull handle, the second and third tension sections form a dynamically determined pulley angle therebetween, the pulley angle apex is at the pulley member; and the pulley member is arranged such that a tensile force is transmitted thereto by the second and third tension section causes movement thereof in a direction that form a dynamically determined pin angle between a first and a second force sections of the first tension section dynamically determined at the engagement point, the pin angle apex being at the engagement point, the pulley angle and the pin angle each being smaller than 180°.

It may therefore be seen that various aspects of the invention may be grouped under a generalized embodiment of the ripcord pull force reducer with varying components and arrangements, as well as by a parachute container which embodies the generalized version and any and all of the variations disclosed for the generalized version.

The generalized version of the ripcord pull force reducer is characterized by a pin activation line 36A having a first end fixedly coupled to a movable pulley member 10, the pin activation line extending from the movable pulley member, and slidingly engages the pin 45 at a pin engagement point 46, at least a portion of the pin activation line forming a first tension section extending between the movable pulley member and a first anchor point 60, 60A. A pulley activation line 36B extends from a second anchor point 60B to the pulley member 10 and slidingly engaging therewith, a portion of the pulley activation line forming a second tension section 30 between the second anchor point 60B and the movable pulley member 10, the pulley activation line further extending away from the movable pulley member to form a third tension section 35 coupled to a pull handle 50.

Figure 4:
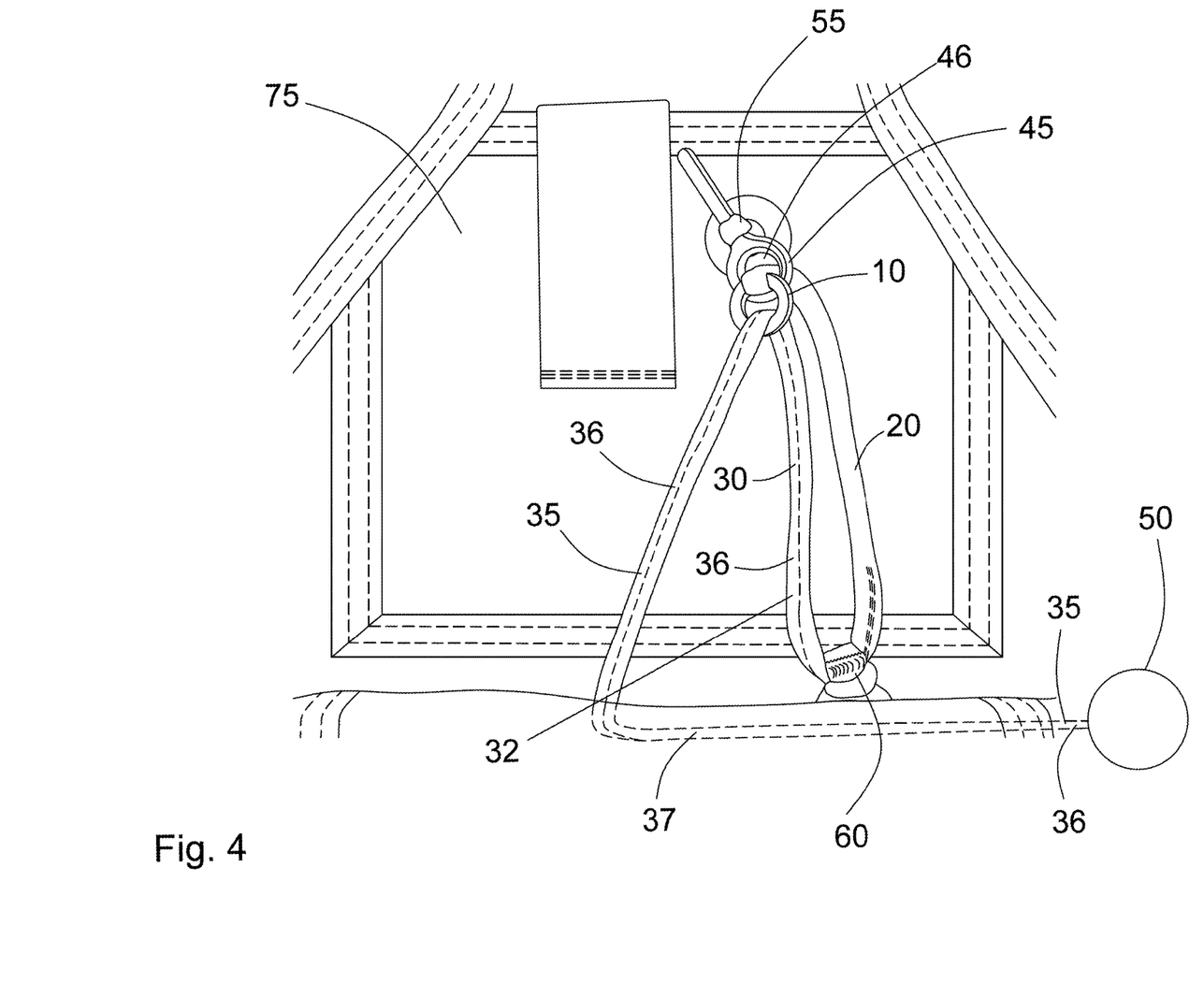
FIG. 4 depicts a front view of an embodiment of the ripcord pull force reduction system installed on the tandem parachute system main container.
Figure 5:
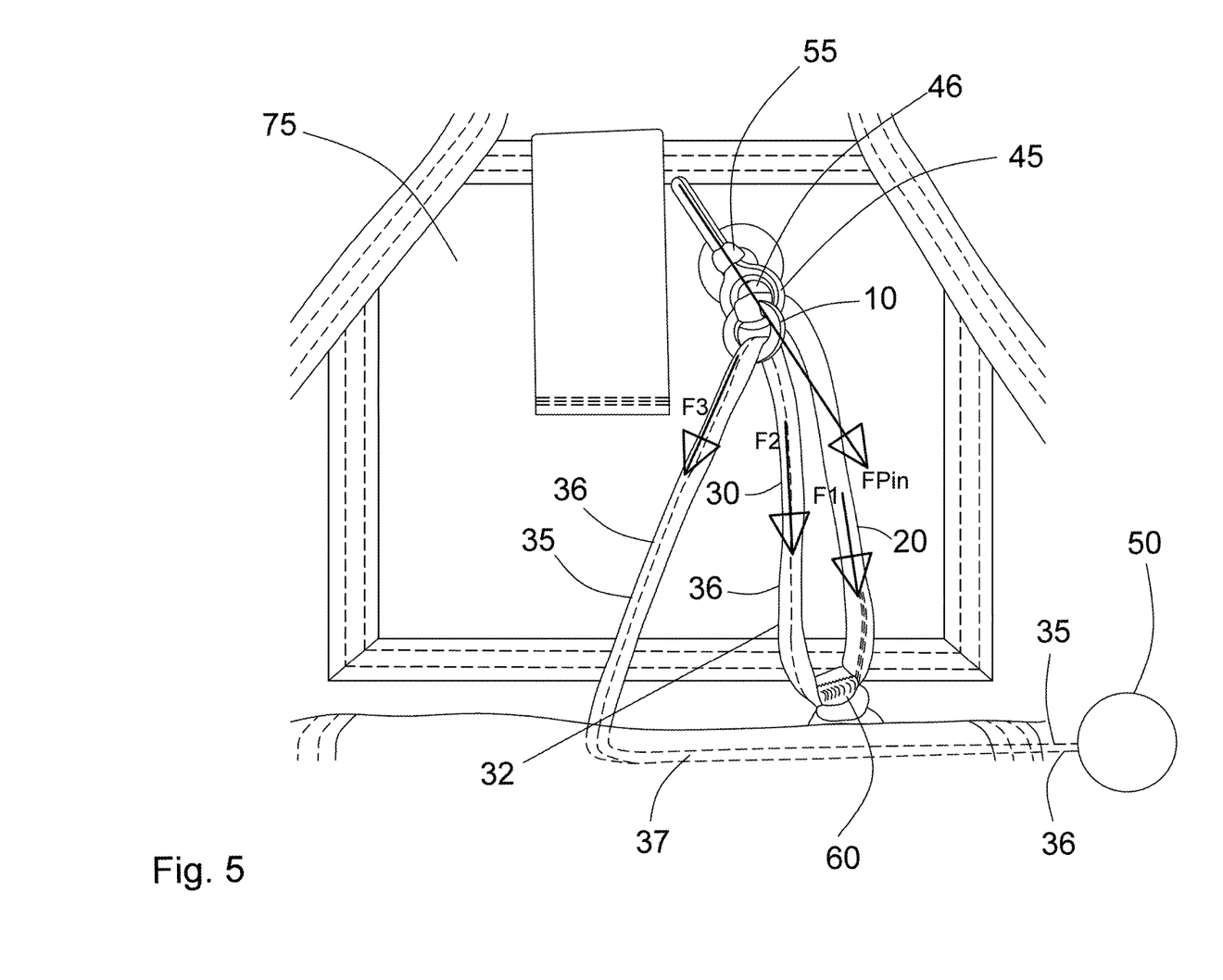
FIG. 5 depicts a simplified force diagram of the system of FIG. 4.

As seen for example in FIGS. 4-5 in some embodiments the first and second anchor points are embodied in a single anchor point 60. Furthermore, the pin activation line and the pulley activation line may be embodied in a single activation line 36, in some embodiments as seen more clearly in FIGS. 7-8. In embodiments resembling those depicted in FIGS. 4-5 the activation line 36 may be either a single line or made of two segments 36A and 36B, and construction using a single line or a plurality of line segments is considered equivalent. In some embodiments utilizing a single anchor point 60, the anchor point 60 comprises a stationary pulley member and the single activation line slidingly engages the stationary pulley, as seen by way of example in FIGS. 7-8. In all embodiments, the second and third tension sections are delineated by the movable pulley member 10.

In embodiments where a single activation line 36 is utilized, the first and second tension sections are dynamically delineated by the anchor point 60.

The second and third tension sections are arranged such that when tensile force is applied to the pulley activation line from the pull handle, such as the force applied to the pull handle by a parachutist in order to open the parachute, the second and third tension section impart a tensile force on the movable pulley member, and the tensile force imparted by the second and third tension section to the movable pulley member causes a movement thereof in a direction that causes the first tension section to impart a force to the to the pin, for dislodging the pin from the closing loop, allowing opening of the parachute container and thence opening of the parachute.

As described above, an aspect of the invention extends to parachute container embodying any of the disclosed variations of the ripcord pull force reducer mechanism, and any combination thereof.

Yet another aspect of the invention extends to methods of rigging parachutes utilizing any of disclosed embodiments of the rip cord pull force reducer mechanisms, and any combination thereof. This method includes the manufacture of new parachute and/or modifying an existing parachute, such as in the form of a kit or by otherwise forming a parachute assembly incorporating such embodiments as disclosed herein. By way of example, a method for modifying an existing parachute assembly having a parachute container 70 with at least one flap 75 secured by a closing loop 55 interacting with a pin 45, and a ripcord mechanism coupled to the pin, the method would comprise, inter alia slidingly engaging the pin 45 by a pin activation line 36A having a first end fixedly coupled to a movable pulley member 10, extending the pin activation line from the pin engagement point and coupling the pin activation line to the container 70, coupling a pulley activation line 36B to the container 70, extending the pulley activation line from the container 70 to the movable pulley member 10 and slidingly engaging the pulley activation line 36B with the movable pulley member 10, and extending the pulley activation line 36B away from the movable pulley member 10 to form a third tension section 35 coupled to a ripcord pull handle 50.

Optionally, the pin activation line 36A and the pulley activation line 36B may be coupled to the container 70 at a single anchor point 60, or stated differently, anchor points 60A and 60B may be embodied by a single anchor point 60.

Further optionally the pin activation line 36A and the pulley activation line 36B may comprise a single line 36. Further optionally the single activation line 36 may be slidingly coupled to the container 70, such as by a stationary pulley and the like.

Similar options described in relation to other aspects may be applied to this aspect of the invention. Thus, by way of example the parachute container described above may be provided wherein the first tension section is formed by a first activation line segment and the second and third tension sections are formed by a second activation line segment. In yet another example of features provided in other aspects of the invention, the parachute container anchor point may comprise a second, fixed pulley member, and the activation line slidingly engages the fixed pulley. A parachute container falling under the scope of this invention may comprise only one flap, or a plurality of flaps.

BRIEF DESCRIPTION OF THE DRAWINGS

Some embodiments of the invention are described herein with reference to the accompanying drawings. The description, together with the figures, enables and makes apparent to a person having ordinary skill in the art how the teachings of the disclosure may be practiced, by way of non-limiting examples. The figures are for the purpose of illustrative discussion and no attempt is made to show structural details of an embodiment in more detail than is necessary for a fundamental and enabling understanding of the disclosure. For the sake of clarity and simplicity, some objects depicted in the figures are not to scale. Understanding that these drawings depict only typical embodiments of the invention and are not therefore to be considered limiting of its scope, the invention will be described and explained with additional specificity and detail through the use of the accompanying drawings in which.

While aspects of the present invention will be described with reference to the details of the embodiments of the invention shown in the drawings (and some embodiments not shown in the drawings), these details are not intended to limit the scope of the invention.

DETAILED DESCRIPTION OF EXEMPLARY EMBODIMENTS

Embodiments of a force reducer and additional components will be described below, by way of exemplary illustration only. The described embodiments should not be construed as limiting the scope of different aspects and embodiments of the invention. Versions illustrating basic concepts of various aspects of the invention are shown in the drawings. FIG. 4 depicts one embodiment of the ripcord pull force reducer according to an aspect of the invention. The force reducer comprising an activation line 36 having a first end coupled to a movable pulley member 10. The pulley members depicted in the drawings comprises a smooth ring made of polished metal, however the skilled in the art would recognize that any pulley may be utilized, including, by way of example, a sheave on axel, a roller, and the like, in order to further reduce frictional losses. The pulley member may be any suitable shape—oval, elongated, curved, geometric shapes, etc. Various parts of the activation line would be described utilizing relative terms such as upstream and downstream, where downstream is considered further away from the point where the activation line 36 is fixedly attached to the pulley member 10 along the path of the activation line.

The activation line 36 is fixedly coupled to the pulley member in any convenient manner, such as a knot, suture, seam(s) and the like, and extends therefrom through the pin eyelet 46 such that the activation line is slidingly movable therethrough. Further downstream, the activation line forms a first tension section 20 which extends generally between the pulley member 10 and the anchor point 60. In the depicted embodiment the activation line 36 continues and forms a second tension section 30 which extends between the anchor point 60 to the pulley member 10 where it engages the pulley member, such as by being passed through the smooth ring, so that the activation line is slidingly moveable therethrough. The portion of activation line 36 downstream from the pulley member 10 forms a third tension section 35. It is noted that the first tension section 20 extends away from the pin 45 towards the anchor point 60, the second tension section 30 extends towards the pulley member 10 from the anchor point 60, and the third tension section 35 extends away from the pulley member 10. It is further noted that as the first tension section is anchored to the anchor point, a separate activation line may be utilized to form the second 30 and third 35 tension sections, and any extensions thereof. If such separate activation line segments are utilized they constitute in practice a single activation line with two segment, and are equivalent to a single activation line. Furthermore if separate line segments are connected to form the activation line such connected segments are equivalent to a single activation line. When a line is said to engage a pulley member it should be construed that the line passes through or about the pulley member in a manner that would sum forces applied by the downstream and upstream portions of the activation line, while allowing a lengthwise sliding movement of the line in or about the pulley member. By way of example the activation line may be passed through a smooth ring type pulley member, routed around the sheave in sheave on an axle member, routed about a post in post type pulley member, and the like.

The third tension section 35 is coupled to the pull handle 50. Commonly this coupling is carried out via at least one extension section of the activation line, which optionally passes via a channel 37 for convenient placement of the handle. The construction of the extension section and the channel 37 may be achieved in numerous manners, such as by a plurality or conveniently placed rings, a conduit, one or more fabric pockets and the like. Optionally a plurality of pull handles may be provided. Further optionally, elastic member(s) may be added to retract the pull handle after deployment.

Figure 5A:
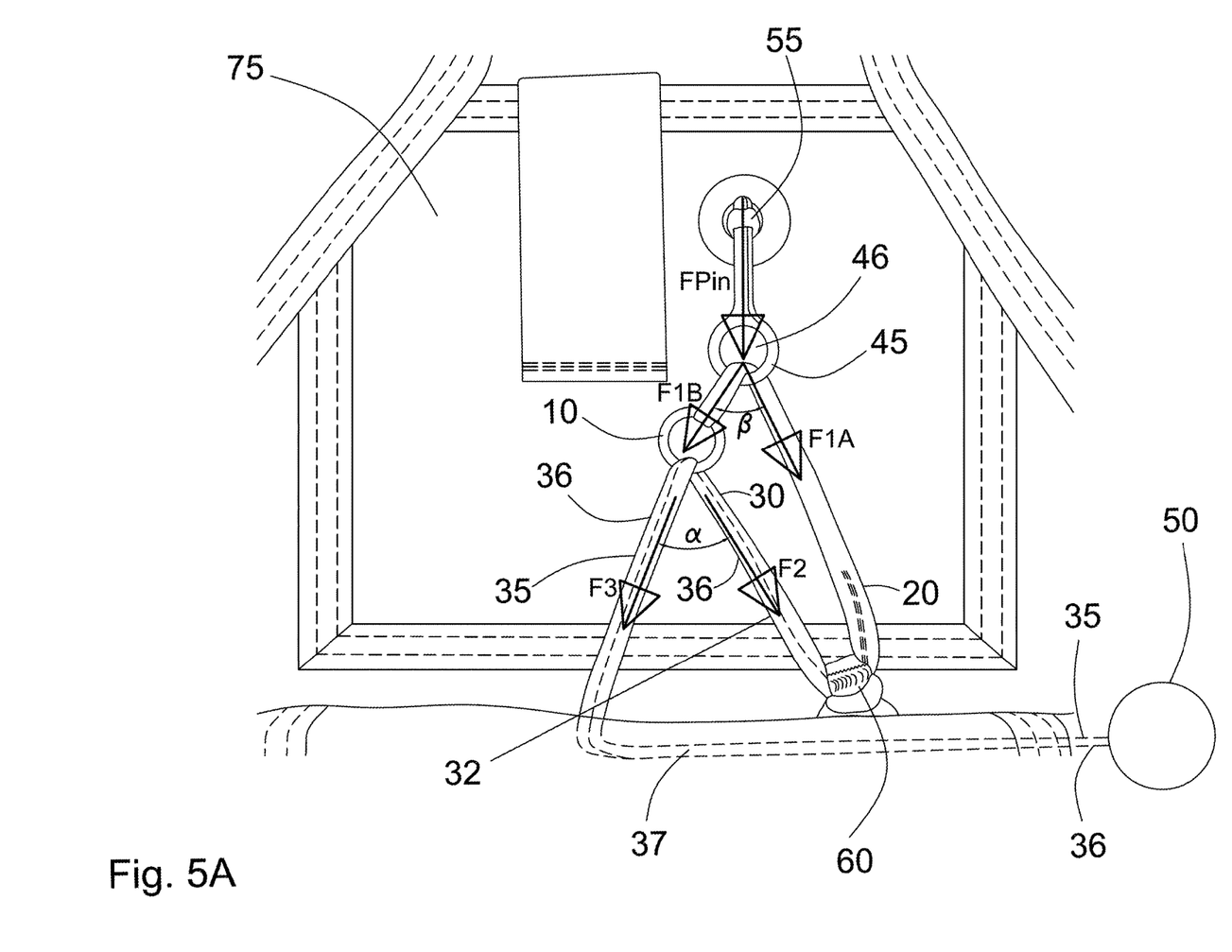
FIG. 5A depicts a simplified force diagram of the systems of FIG. 5 when a pull force is exerted to the pull handle, and just prior to release of the pin from the closing loop.

Those skilled in the art would readily recognize that the above described embodiment forms a compound pulley system, as the forces at the beginning of a pull of the activation handle, are shown in simplified force diagram of FIG. 5. FIG. 5A depicts the simplified force diagram during a pull of the activation handle just prior to release of the pin from the closing loop. When the handle 50 is pulled during drogue-fall, the pull causes a tensile force to be applied to the activation line 36 the tensile force is transmitted through the optional channel 37 and exerts a pull force F3 to the third tension section 35 onto the pulley member 10 which changes the direction of the tensile force and transmits at least a portion thereof to the second tension section 30 and to the anchor point 60 thus exerting pull force F2 on the pulley member 10, in generally similar direction to the direction of force F3, which in FIG. 5 is shown as a generally downwardly directed force, at varying angles. The forces F2 and F3 form an angle termed pulley angle α therebetween with the apex at the pulley member, a being smaller than 180°. The forces F2 and F3 exert a combined pull force on the pulley member 10 which transmits the combined sum of forces F2 and F3 to the first tension section 20 and therethrough to the anchor point 60, the force on the first tension section depicted schematically as F 1. As the pulley member is pulled away from the pin, the first tension section may be considered to form a first force section F1A and a second force section F1B, the division therebetween is determined dynamically where the two force sections engage the pin, such as the pin eyelet 46. The first and second force sections form an angle termed pin angle β therebetween with the apex being the pin engagement point by the first tension section, β being smaller than 180°. The tensile force exerted on the pin 45 by the first and seconds force sections at the pin engagement point results in force Fpin which is operative to dislodge the pin from the closing loop 55. Due to mechanical advantage the required force F3 exerted by the operator's pull of handle 50 is significantly lower than the force required to dislodge the pin 45, assuming negligible friction. Notably, the division of the first tension section into the first and second force sections F1A and F1B respectively, is not physically a parting of the activation line, but is rather a force division and a dynamic division in accordance to the forces which operate on the first force section F1A which extends between the engagement point of the pin 45 and the anchor point 60, and the second force member F1B which extends between the engagement point and the pulley member 10. While the pin engagement point is depicted as the pin eyelet 46, equivalent engagement arrangements will be clear to the skilled in the art. The term "dynamically" and "dynamically determined" are utilized as the corresponding angles and activation line sections change during the pull operation.

The selection of the anchor point is a matter of technical choice, as long as the anchor point can provide the required strength and is disposed so as to provide the direction required for the tension section 20 to exert the pull forces on pin 45 when pulled by the second and third tension sections 30 and 35, to dislodge the pin from the closing loop 55 when sufficient tension is applied.

Figure 6:
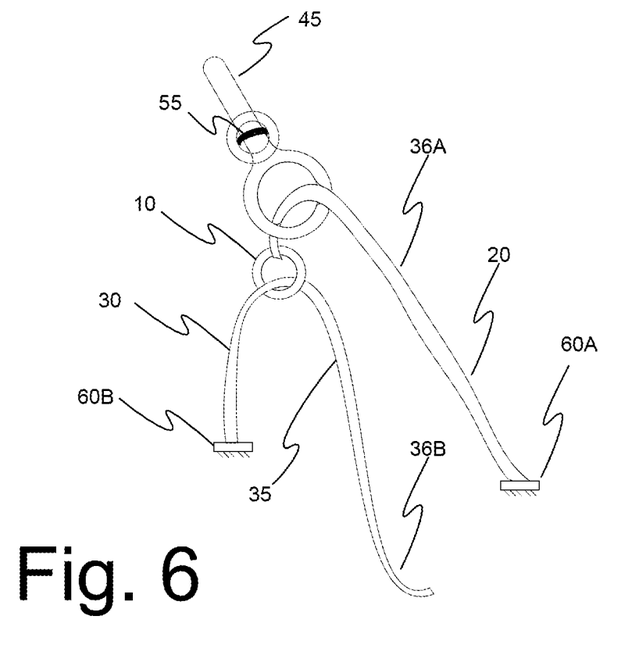
FIG. 6 depicts a schematic of another embodiment of the ripcord pull force reduction system, further depicting two anchor points.

FIG. 6 depicts a simplified diagram of an embodiment utilizing two activation lines 36A and 36B, each coupled to a different anchor point 60A and 60B respectively. The skilled in the art would recognize that the system is equivalent, and operates similarly to a system utilizing a single anchor point. This example is provided to demonstrate the flexibility of solutions to the ripcord force reduction arrangements offered by the compound pulley system of the present invention.

Figure 7:
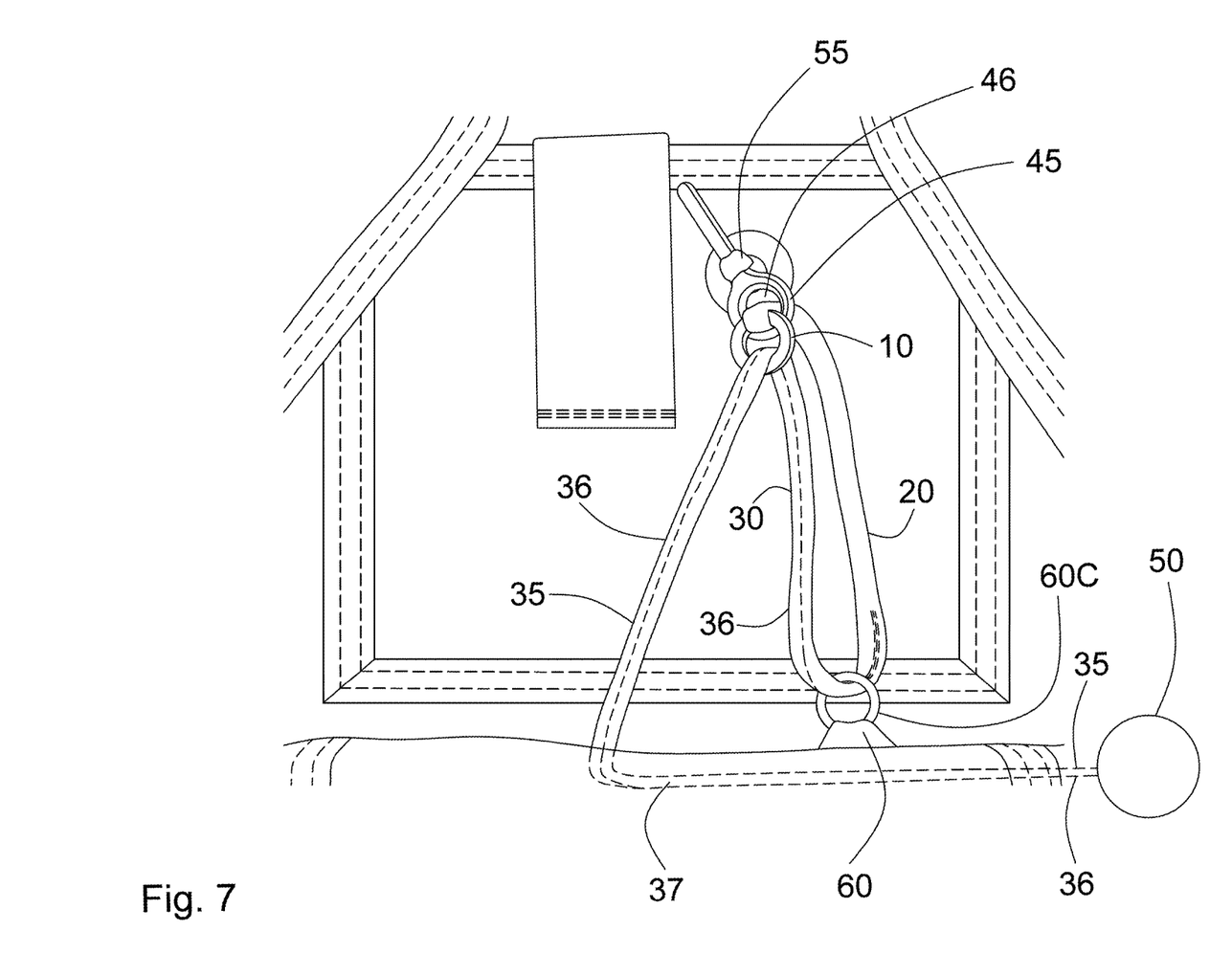
FIG. 7 depicts a front view of yet another embodiment of the ripcord pull force reduction system showing smooth ring as optional anchor point.

FIG. 7 depicts yet another aspect of the invention which offers higher mechanical advantage. In this embodiment a second pulley member 60C forms, and acts as, the anchor point 60. As described for the first pulley member 10, pulley member 60C may be embodied in various implementations such as a smooth ring, a roller, a sheave on axle, a post, and the like.

In the embodiment depicted in FIG. 7, the activation line 36 is fixedly coupled to the pulley member 10 and extends therefrom through the pin eyelet 46 and towards the second pulley member 60C where it engages the second pulley member 60C. The section of the activation line 36 extending between the first and second pulley members forms a first tension section 20. The second pulley member 60C acts similarly to anchor point 60, except that the activation line 36 is slidingly movable relative thereto. Thence, the activation line 36 continues and forms a second tension section 30 which extends from the second pulley member 60C to the first pulley member 10 where it engages the first pulley member. Thence, the portion of activation line 36 downstream from the pulley member 10 forms a third tension section towards the pull handle 50. It is noted that the first tension section 20 extends generally away from the pin 45, the second tension section 30 extends towards the first pulley member 10 from the second pulley member 60C, and the third tension section 35 extends away from the pulley member 10 towards the pull handle 50.

Figure 8:
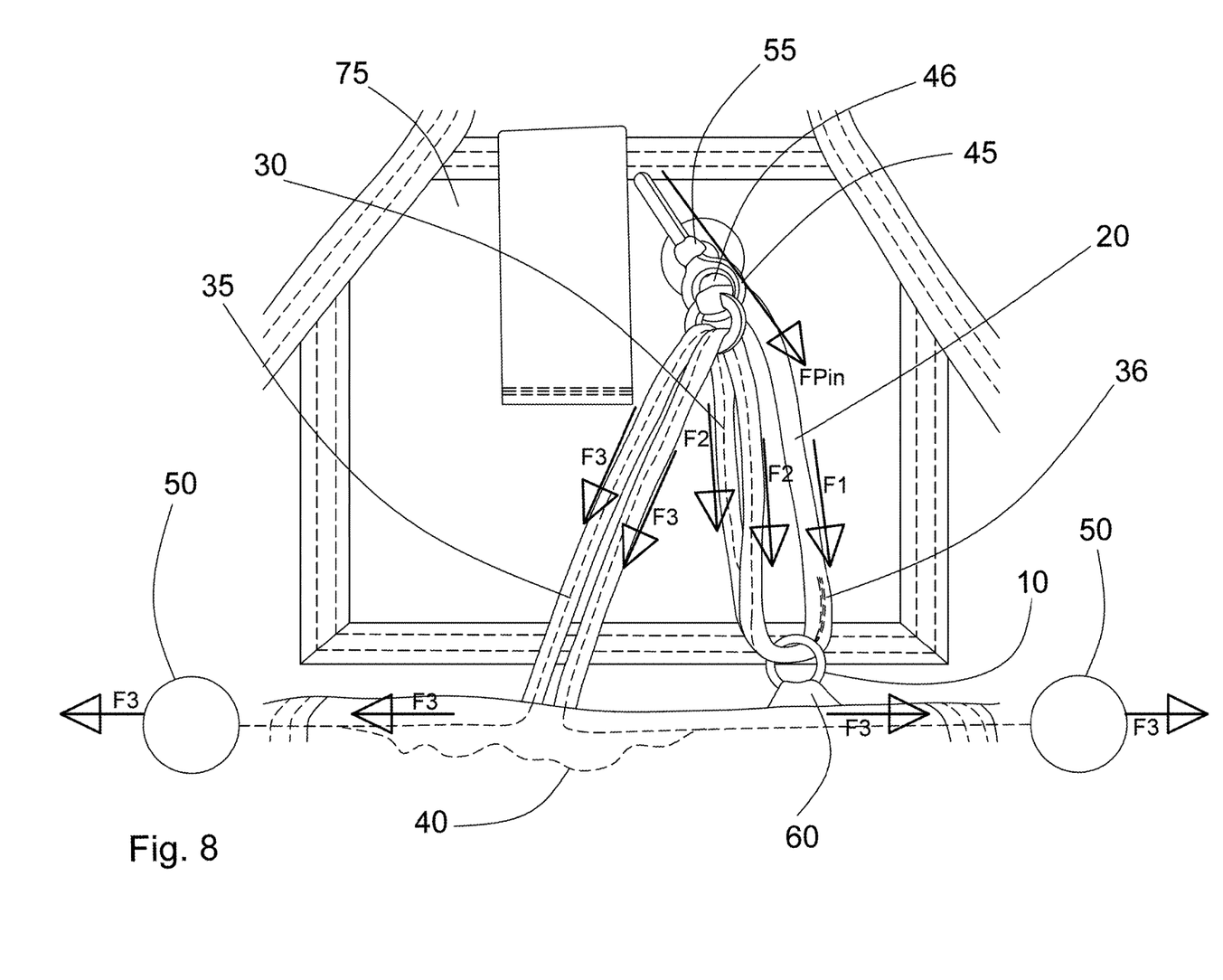
FIG. 8 depicts another version showing smooth ring as anchor point and optional second handle and bungee retraction line.

The above arrangement forms a compound pulley system. This is depicted in FIG. 8, where a tensile force applied to either pull handle 50 is translated to a pull force F3 operated by the third tension section 35 on the first pulley member 10, the first pulley member changes the force direction and applies it to the second tension section 30, resulting in an opposing pull force F2 acting between the first 10 and second 60C pulley members. The second pulley member 60C transfers the tensile force to the first tension section 20, which exerts a pull force F1 on the pin 45, as the first pulley member is also being pulled away from the pin. The sum of the combined forces F1, F2, and F3 all act to form a pin force Fpin, which is operative to dislodge pin 45 from the holding loop 55. It is clear that the force Fpin is significantly greater than the original tensile force exerted on the pull handle 50, assuming negligible friction, thus providing the mechanical advantage to reduce the rip cord pull force required to dislodge pin 45 from the closing loop 55, and thereby free the main parachute from the parachute container 70. The forces are roughly the same for either left or right handle, as shown in FIG. 8. The handle(s) may be made from a short piece of PVC pipe, well known in the industry, or golf ball, sewn ball or any other type/size/shape handle suitable for this use.

In the embodiment of FIG. 7, when packing the main parachute which is disposed in the parachute bag 64 into the parachute container, the pin 45 is inserted into the closing loop 55 which secures the flaps to contain the parachute bag 64 within the parachute container 70. An activation line 36 is fixedly secured to a pulley member 10 depicted as a smooth ring. The activation line is then threaded through the opening 46 in the pin and is threaded through the second pulley member 60C to engage it. The activation line 36 is then threaded via the first pulley member 10 so as to engage it. Thence the activation line is coupled directly or indirectly to at least one pull handle 50. The second pulley member 60C acts as an anchor point similar to the anchor point 60 in FIG. 4, yet it further provides an additional pulley function due to the sliding of the activation line via the second pulley 60C, further reduces the force required to release the pin and activate the parachute release sequence.

Commonly the coupling of the activation line 36 and the handle 50 is done by passing the activation line via a tunnel 37. As shown in FIG. 8, in some embodiments two handles are utilized, each providing the required path to transfer tensile force from an operator pull to the pulley members and therefrom to the pin 45. As is known in the art, an elastic member such a bungee cord 40 or a spring may be utilized to retract the handle 50 to its resting location following a deployment pull. Such coupling may be considered an extension of the activation line from the third tension member and various embodiments of the extension may be used in any and all of the disclosed embodiments.

The drawings show the components in a pre-configured arrangement with given lengths. Arranging the activation line(s) in other pre-configured arrangements not shown in the drawing examples should be construed as falling under the scope of various aspects of the invention.

In an example of using the depicted embodiment of the ripcord device in a tandem parachute drogue arrangement, one would simply pull the handle 50 and the system withdraws the pin 45 from the closing loop 55.

The attachment arrangement and/or devices and methods for connecting a tension device to the fixed anchor point 60 may be of any suitable type—loop, aperture, glue, sewn, finger trap, webbing, fastener, screw, bolt, ultrasonic weld, friction adapter, snap shackle, connector link (either hard or "soft" as known in the art), grommet, snap, thread, rope, twine, rod, connector, and/or any other connecting arrangement, either attached/secured permanently, temporarily and/or releasably attached. The term 'anchor' should be construed as a point which allows one or more tensile forces to be exerted thereupon by the activation line without allowing sufficient thereof to disrupt the operation described herein. Commonly the anchor point is coupled to the parachute container.

Figure 9:
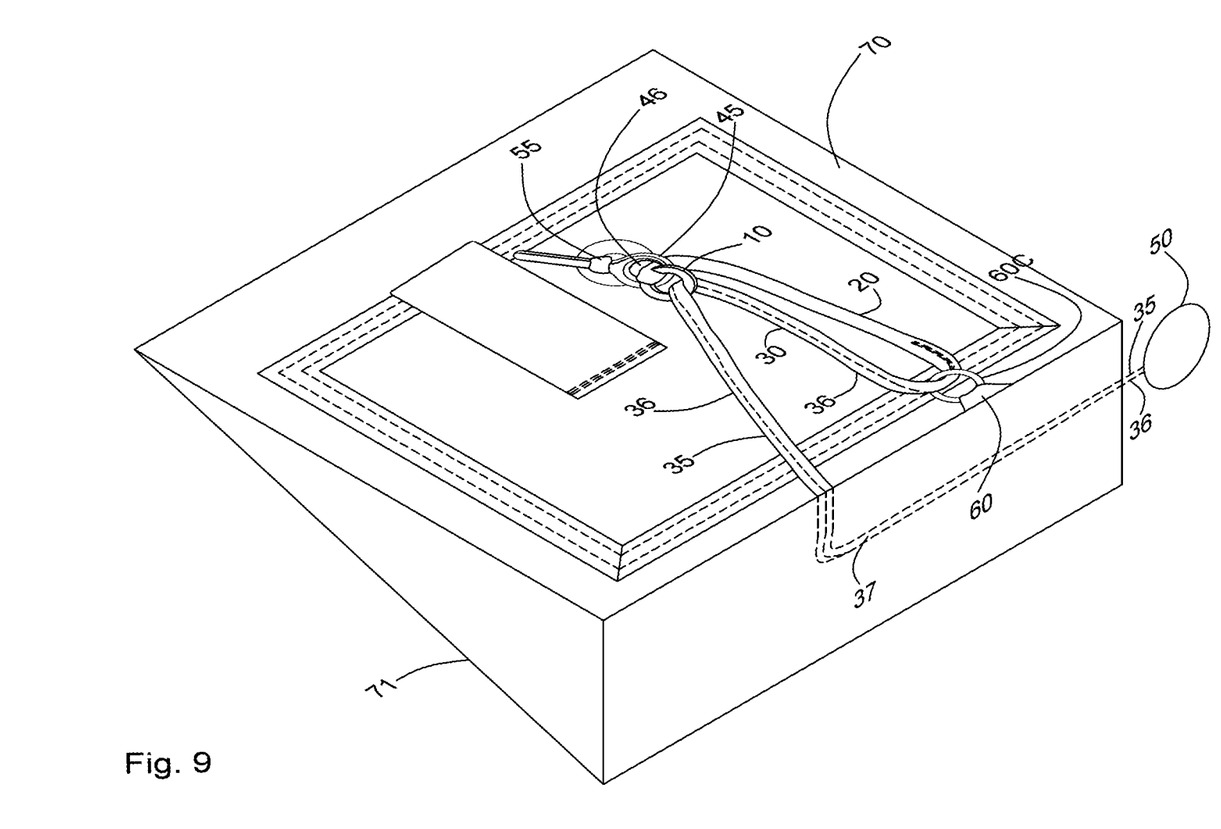
FIG. 9 depicts a parachute container with ripcord pull force reducer.

FIG. 9 depicts another aspect of the invention depicting a parachute container with ripcord pull force reducer. The depicted container uses only one flap but the container aspect of the invention extends to a container with a plurality of flaps as well.

Various components of embodiments of the ripcord pull force reducer may be integrated onto each other and/or formed of a plurality of cooperating portions, while still falling under the scope of the invention and the claims.

It is important to recognize that the a portion of the novelty of this aspect constitutes the recognition of the need for a ripcord force reduction in a heavy load parachute system and its selection based on the novel advantages of reducing the ripcord pull forces required for releasing the drag of the drogue as well as deploying the main parachute, with the resulting increase in load capacity.

Versions of the invention may be made with any and all suitable materials desired as needed for the appropriate use and the invention and embodiments thereof are not limited by the type of materials used in implementing thereof. Versions are scalable and may be made any suitable size. Versions of the invention may be retro-fitted to existing (used) conventional parachute systems and/or embodied in new parachute construction.

To make a version of the invention in a preferred embodiment, one skilled in the art may follow instructions and drawings disclosed herein, by way of example and for illustration, however these instructions and drawings should not be construed as limiting.

The term line as used herein encompasses actual lines—ropes, cables, wires, cords, belts, webbing, and the like, group or groups of lines, such as a plurality of separate lines, as well as intermediate elements such as rods, shackles, eyelets, hooks, links, and the like. A common type of line in the parachute ripcord field is known as braided cord, however other types of line may be utilized. Any combination of lines and extensions thereof such as shackles, eyelets, and the like which transfer the forces through the line should be construed as the line itself. The term activation line should be construed as a line which is being directly or indirectly pulled by the parachute system operator to activate the deployment sequence of the main parachute. An activation line is generally flexible, however such activation line may comprise any combination of flexible and/or rigid and/or semi-rigid lines, as long as the activation line assembly as a whole provides the capacity to transmit the forces described, and to allow component movement to dislodge the pin with reduced pull force.

Notably, whenever the term 'and/or' is used in these specifications and the attached claims, it should be construed as any number, combination or permutation of all, one, some, a plurality or none of each of the item or list mentioned. It is also understood that (s) designates either singular or plural. It is further understood that that "or" is an inclusive "or" to include all items in a list and not intended to be limiting and means any number, combination or permutation of all, one or plurality of each of the item or list mentioned, unless the term 'or' is explicitly defined as exclusive, or if the context would clearly indicate an exclusive or to the skilled artisan. It is also understood that "include(s)" and/or "including" means "including but not limited to" any number, combination or permutation of all, one or plurality of each of the item or list mentioned.

The term pin should be construed broadly to cover any common parachute pin such as flexible pins, curved pins, cutting knives, coated flexible metal, rigid line, and the like and other usable custom-shaped pins. Selection of materials for various elements of the invention like the pin, pulley, and activation line may be any material or combination of materials suitable to meet at least the respective load and other structural requirements may be utilized.

Although the foregoing invention has been described in detail by way of illustration and example, it will be understood that the present invention is not limited to the particular description and specific embodiments described but may comprise any combination of the above disclosed elements and their equivalents and variations thereof, many of which will be obvious to those skilled in the art in view of the present disclosure, and the invention extends to such variations.

What is claimed is:

1. A parachute compound pulley ripcord pull force reducer comprising:

A first line section having a first end fixedly coupled to a movable ring member and a second end fixedly attached to an anchor point, the first line section slidingly engages a pin having an eyelet forming a pin engagement point, the first line section forming a first tension section;

An activation line fixedly coupled to the anchor point and extending therefrom to slidingly engage the movable ring member, a portion of the activation line between the anchor point and the movable ring member forming a second tension section, the activation line further extending away from the movable ring member to form a third tension section coupled to a pull handle, the activation line being arranged such that a tensile force applied to the pull handle is transmitted to the pin via the first, second, and third tension sections, the second and third tension sections forming a dynamically determined angle therebetween during application of the tensile force to the handle.

2. A parachute compound pulley ripcord pull force reducer comprising:

an activation line having a first end fixedly coupled to a movable ring member, the activation line extending therefrom and slidingly engaging a pin at a pin engagement point, a portion of the activation line forming a first tension section extending generally between the movable ring member and an anchor ring, the activation line slidingly engaging the anchor ring and further extending from the anchor ring to slidingly engage the movable ring member, a portion of the activation line forming a second tension section between the anchor ring and the movable ring, and further extending away from the movable ring member to form a third tension section coupled to a pull handle, the activation line being arranged such that a tensile force applied to the pull handle is transmitted to the pin via the first, second, and third tension sections.

3. The parachute ripcord pull force reducer as claimed in claim 2, wherein the first tension section and the second tension section are delineated at the anchor ring.

4. A parachute container comprising:
a. A compartment comprising a backing and at least one flap having a closing hole;
b. a closing loop coupled to the container, the closing loop positioned to interact with the closing hole to maintain the flap is a closed state by a pin passed in the closing loop, the pin having a pin engagement point;
c. an anchor point coupled to the container;

d. an activation line having a ring member coupled to an end thereof, the activation line extending from the ring member and slidingly engaging the pin at an engagement point, a first segment of the activation line forming a first tension section extending generally between the ring member and the anchor point, the activation line further extending from the anchor point to the ring member and slidingly engaging the ring member, a portion of the activation line forming a second tension section between the anchor point and the ring member, and further extending away from the ring member to form a third tension section coupled to a pull handle; the second and third tension sections are formed by a second segment of the activation line and are being arranged such that when tensile force is applied to the activation line from the pull handle, the second and third tension sections form a dynamically determined pulley angle therebetween, the pulley angle apex being at the ring member, and the second and third tension section imparting a tensile force on the ring member.

5. A parachute container comprising:

a. a compartment comprising a backing and at least one flap having a closing hole;

b. a closing loop coupled to the container, the closing loop positioned to interact with the closing hole to maintain the flap is a closed state by a pin passed in the closing loop, the pin having a pin engagement point;

c. an anchor point coupled to the container;

d. an activation line having a first end fixedly coupled to a movable ring member, the activation line extending therefrom and slidingly engaging a pin at a pin engagement point, a portion of the activation line forming a first tension section extending generally between the movable ring member and an anchor ring coupled to the anchor point, the activation line slidingly engaging the anchor ring and further extending from the anchor ring to slidingly engage the movable ring member, a portion of the activation line forming a second tension section between the anchor ring and the movable ring, and further extending away from the movable ring member to form a third tension section coupled to a pull handle, the activation line being arranged such that a tensile force applied to the pull handle is transmitted to the pin via the first, second, and third tension sections.

\* \* \* \* \*